G. MATTSSON.
METHOD OF PRODUCING INTERIORLY CYLINDRICAL SURFACES HAVING AN EXACT DIAMETER.
APPLICATION FILED DEC. 6, 1919.
1,360,558.
Patented Nov. 30, 1920.
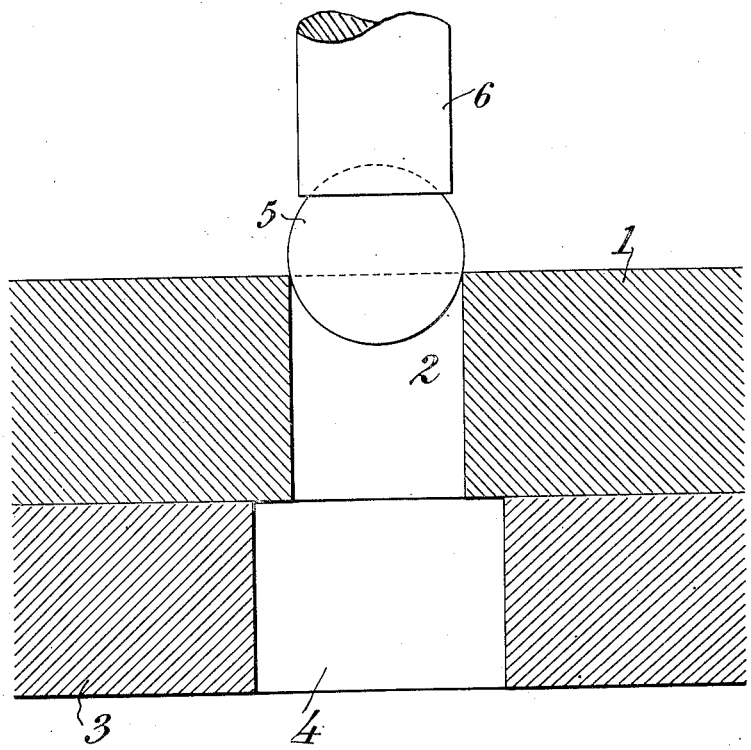
INVENTOR :
Gunnar Mattsson
By Attorneys,
Fraser, Jurk & Myers

UNITED STATES PATENT OFFICE.

GUNNAR MATTSSON, OF GOTTENBORG, SWEDEN.

METHOD OF PRODUCING INTERIORLY-CYLINDRICAL SURFACES HAVING AN EXACT DIAMETER.

1,360,558.      Specification of Letters Patent.      Patented Nov. 30, 1920.

Application filed December 6, 1919. Serial No. 343,120.

*To all whom it may concern:*

Be it known that I, GUNNAR MATTSSON, a subject of the King of Sweden, residing at Gottenborg, in the Kingdom of Sweden, have invented new and useful Improvements in or Relating to Methods of Producing Interiorly-Cylindrical Surfaces Having Exact Diameters, of which the following is a specification.

This invention relates to a method of producing cylindrical holes of exact diameter in objects made of rigid material, such as wheel blanks or other machine parts which are to conform with other machine parts. The invention may be carried out by first making an approximately accurate hole of slightly smaller diameter than the finished hole to be produced. This may be accomplished in any suitable manner, as, for instance, by boring or turning in a lathe and broaching, after which the hole may be finished to accurate diameter by means of one or more spherical polished steel balls which may be driven by any suitable tool through the hole thus made, the diameter of the ball or balls being slightly, that is, up to 0.15 mm., larger than that of the hole.

The method is particularly adapted for use in the production of hub holes in gear wheel blanks and the like, in which the operating surfaces or elements are to be subsequently produced in an exact relation to the hub holes, the surrounding surfaces of which thus serve as guiding means. The accuracy of the positioning of the operating surfaces will thus be dependent on the accuracy in the making of the hub holes, which is, therefore, of great importance, especially when manufacturing on a large scale, in which case the various parts of the thing produced should be interchangeable.

In the production of hub holes in, for instance, bevel wheel blanks, while the plane under side of the hub and the usually cup-shaped lower part of the wheel blank may be turned in a lathe, the preparatory rough forming of the hub hole is usually effected by boring. Inasmuch as, in this operation, no precision is required, it is inconsequential if, through wear of the boring tool, the diameters of the holes in the different blanks are not exactly equal. While holding the wheel blank as before, this preparatory hub hole is turned to a diameter which is less than that desired by one or a few tenths of a millimeter, whereupon the hole is broached so that the diameter becomes as nearly that desired as possible. Since, however, in broaching a series of holes, one after another, the wearing of the broach is unavoidable, the holes will necessarily have slightly different diameters. Moreover, it is practically impossible, in broaching a hole, to make it absolutely cylindrical in shape, due to the fact that, through the inevitable bending of the broach, the diameter will, generally, be somewhat larger at the ends of the hole than at the middle thereof. In order to remedy this defect, the hole is subsequently treated by pressing through it one or more spherical polished steel balls the diameters of which are slightly larger than that of the broached hole. By this means the diameter of the hole will be increased to exactly that desired, and will be made equal along its whole length, and, moreover, the surface will be smoothly polished. During the following turning of the conical surface and the top surface of the wheel blank, the blanks are kept fastened to an accurately centered mandrel which, on account of the accurate forming of the hub holes, hereinbefore described, will exactly fit all wheel blanks having the same bore.

The ball, or one or more of them if a plurality are used, should be slightly larger in diameter than the desired diameter of the finished hole, due to the fact that the hole contracts somewhat after being expanded by the ball or balls, and that the ball is (or balls are) slightly compressed, when driven through the hole.

Due to the fact that all sections through the center of the ball are circles of equal diameter, any turning of the ball, during its passage through the hole being made, will not vary the diameter of said hole at any point.

In the drawing, a device for carrying out the last operation according to the invention is schematically shown.

In the figure, 1 designates a cut off portion of any machine part whatever in which is a hole 2. The part 1 rests on a firm bed 3 in which is also a hole 4 the diameter of which is larger than that of the hole 2 of the blank. Placed at one end of the hole 2 to be treated, preferably at the upper one, is a hardened and polished steel ball adapted to be driven, by a suitable tool 6, through the hole 2, which is thereby expanded to an exact and uniform diameter corresponding nearly to that of the ball 5. At the same time the surface of the hole will be polished on account of the pressure and the rubbing against the polished surface of the ball.

I claim:

1. The method of producing a cylindrical hole of exact diameter in a machine element or other article of rigid material, which consists in first making an approximately accurate hole of slightly smaller diameter by means of any appropriate tool or tools, and subsequently enlarging the same to the desired accurate size by forcing therethrough a spherical ball of relatively harder material than that of said article, the diameter of said ball being slightly greater than that of the diameter of the finished hole.

2. The method of producing a cylindrical hole of exact diameter in a machine element or other article of rigid material, which consists in first making an approximately accurate hole of slightly smaller diameter by means of any appropriate tool or tools, and subsequently enlarging the same to the desired accurate size by forcing therethrough a succession of spherical balls of relatively harder material than that of said article, the diameter of said balls being slightly greater than that of the diameter of the finished hole.

GUNNAR MATTSSON.